(12) United States Patent
Tadano et al.

(10) Patent No.: US 12,305,760 B2
(45) Date of Patent: May 20, 2025

(54) SEALING DEVICE AND METHOD FOR MANUFACTURING SEALING DEVICE

(71) Applicant: NOK CORPORATION, Tokyo (JP)

(72) Inventors: Hikaru Tadano, Shizuoka (JP); Tokunori Yanagi, Shizuoka (JP); Hiroshi Suzuki, Shizuoka (JP); Koichi Yoshimura, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 18/231,983

(22) Filed: Aug. 9, 2023

(65) Prior Publication Data

US 2024/0052928 A1 Feb. 15, 2024

(30) Foreign Application Priority Data

Aug. 10, 2022 (JP) .................................. 2022-127900

(51) Int. Cl.
*F16J 15/3284* (2016.01)

(52) U.S. Cl.
CPC ................................ *F16J 15/3284* (2013.01)

(58) Field of Classification Search
CPC ........ F16J 15/16; F16J 15/328; F16J 15/3284; F16J 15/54
See application file for complete search history.

(56) References Cited

U.S. PATENT DOCUMENTS

| | | | |
|---|---|---|---|
| 3,217,749 A * | 11/1965 | Greenwald | ............. F25B 1/053 137/614.16 |
| 3,232,579 A | 2/1966 | Jeffrey | |
| 2019/0160910 A1 | 5/2019 | Mano et al. | |

FOREIGN PATENT DOCUMENTS

| | | |
|---|---|---|
| EP | 2 713 083 | 4/2014 |
| FR | 2 827 358 | 1/2003 |
| JP | 2013-92176 A | 5/2013 |

OTHER PUBLICATIONS

Extended European Search Report issued in EP application No. 23189552.5, dated Nov. 21, 2023.

* cited by examiner

*Primary Examiner* — Gilbert Y Lee
(74) *Attorney, Agent, or Firm* — GREENBLUM & BERNSTEIN, P.L.C.

(57) ABSTRACT

Provided are a sealing device that can be easily manufactured and achieve a reduction in friction and a method for manufacturing the sealing device. A sealing device is provided between a housing in which a plurality of opening portions are formed in a tubular inner peripheral surface and a rotor that is disposed in the housing and switches a flow path by rotating relative to the housing. The sealing device includes a sealing device main body that is disposed along the inner peripheral surface and includes a sliding member provided on an inner surface or an outer surface. The sealing device main body has a plurality of through-holes that communicate with each of the plurality of openings, and the sealing device main body is a strip plate-shaped member with a flat plate shape that is bent and deformed.

3 Claims, 10 Drawing Sheets

SEALING DEVICE AND METHOD FOR MANUFACTURING SEALING DEVICE

CROSS REFERENCE TO RELATED APPLICATIONS

This application claims the benefit of Japanese Patent Application No. 2022-127900, filed Aug. 10, 2022, which is hereby incorporated by reference in its entirety.

BACKGROUND

Technical Field

The present disclosure relates to a sealing device and a method for manufacturing a sealing device.

Background

In general, a switching device including a housing in which a plurality of ports are formed and a valve body that is disposed inside the housing and has a communication path, the switching device being adapted to switch a combination of ports for which communication is to be established by a communication path with the valve body rotated, that is, adapted to switch a flow path, is known. As such a switching device, a switching device with an O-ring provided between a main body serving as a housing and a valve body has been proposed (see Japanese Patent Laid-Open No. 2013-92176, for example). The device described in Japanese Patent Laid-Open No. 2013-92176 aims to prevent leakage of a fluid by having the main body and the valve body with conical surfaces and providing an O-ring between them.

A reduction in friction (that is, to reduce a sliding resistance) has been desired for a device that causes a valve body to rotate with respect to a housing as described in Japanese Patent Laid-Open No. 2013-92176. Thus, a configuration provided with a sliding member such as a fluorine resin on a sliding surface is conceivable. Also, this sealing member is required to have a shape along an inner peripheral surface of the housing which is, for example, a cylindrical surface, have a through-hole for causing an opening of the housing and a communication path of the valve body to communicate with each other, and have a through-hole formed in a curved surface. However, it may be difficult to perform complicated working, such as formation of the through-hole in the curved surface, in the sealing member provided with the sliding member, and thus it is difficult to achieve both a reduction in friction and ease of manufacturing.

The present disclosure is related to providing a sealing device that can be easily manufactured and can achieve a reduction in friction, and a method for manufacturing the sealing device.

SUMMARY

In accordance with an aspect of the present disclosure, there is provided a sealing device that is provided between a housing in which a plurality of opening portions are formed in a tubular inner peripheral surface and a valve body that is disposed inside the housing and switches a flow path by rotating relative to the housing, the sealing device including: a sealing device main body that is disposed along the inner peripheral surface and includes a sliding member provided on an inner surface or an outer surface, in which the sealing device main body has a plurality of through-holes that communicate with each of the plurality of opening portions, the sealing device main body being a strip plate-shaped member with a flat plate shape that is bent and deformed.

In the sealing device according to an aspect of the present disclosure, the sealing device main body is restored to become closer to the flat plate shape when the sealing device main body is taken out of the housing and is heated.

In the sealing device according to an aspect of the present disclosure, the sealing device main body has, around the through-holes, bead portions projecting from the inner surface and the outer surface.

In the sealing device according to an aspect of the present disclosure, a surface of the sealing device main body on a side opposite to a surface provided with the sliding member is formed of a rubber material and has gate marks for rubber flowing.

In the sealing device according to an aspect of the present disclosure, an end edge portion of the sealing device main body extending in an axial direction is provided with a sliding member over a region corresponding to half or more from a side of a surface provided with the sliding member.

A method for manufacturing a sealing device according to the present disclosure is a method for manufacturing a sealing device that is provided between a housing in which a plurality of opening portions are formed in a tubular inner peripheral surface and a rotor that is disposed inside the housing and rotates relative to the housing, the method including: forming a strip plate-shaped member with a plate shape that includes a sliding member provided on a side of one surface; forming through-holes in the strip plate-shaped member during formation or after formation of the strip plate-shaped member; and bending and deforming the strip plate-shaped member into a shape along the inner peripheral surface.

In the method for manufacturing a sealing device according to an aspect of the present disclosure, the strip plate-shaped member is molded by stacking a rubber material and a fluorine resin sheet and applying pressure in a stacking direction.

In the method for manufacturing a sealing device according to an aspect of the present disclosure, when the pressure is applied to the rubber material and the fluorine resin sheet, bead portions projecting from both surfaces are formed around the through-holes in the strip plate-shaped member or around positions where the through-holes are to be formed.

In the method for manufacturing a sealing device according to an aspect of the present disclosure, pressure is applied to the rubber material and the fluorine resin sheet by using a mold having a rubber injection portion.

According to the sealing device and a method for manufacturing a sealing device of the present disclosure, it is possible to easily manufacture the sealing device and to achieve a reduction in friction.

DETAILED DESCRIPTION

Figure 1:
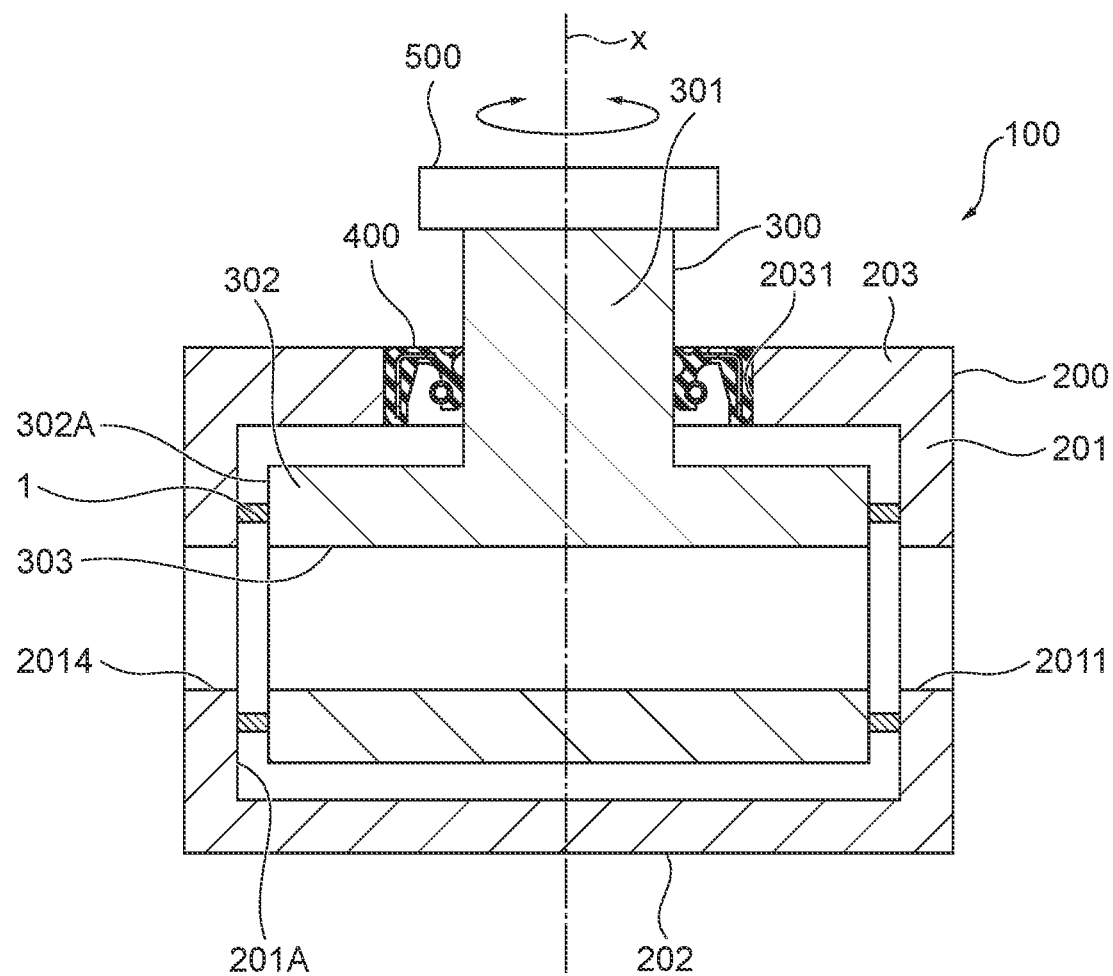
FIG. 1 is a vertical sectional view of a switching device provided with a sealing device according to an embodiment of the present disclosure.
Figure 2:
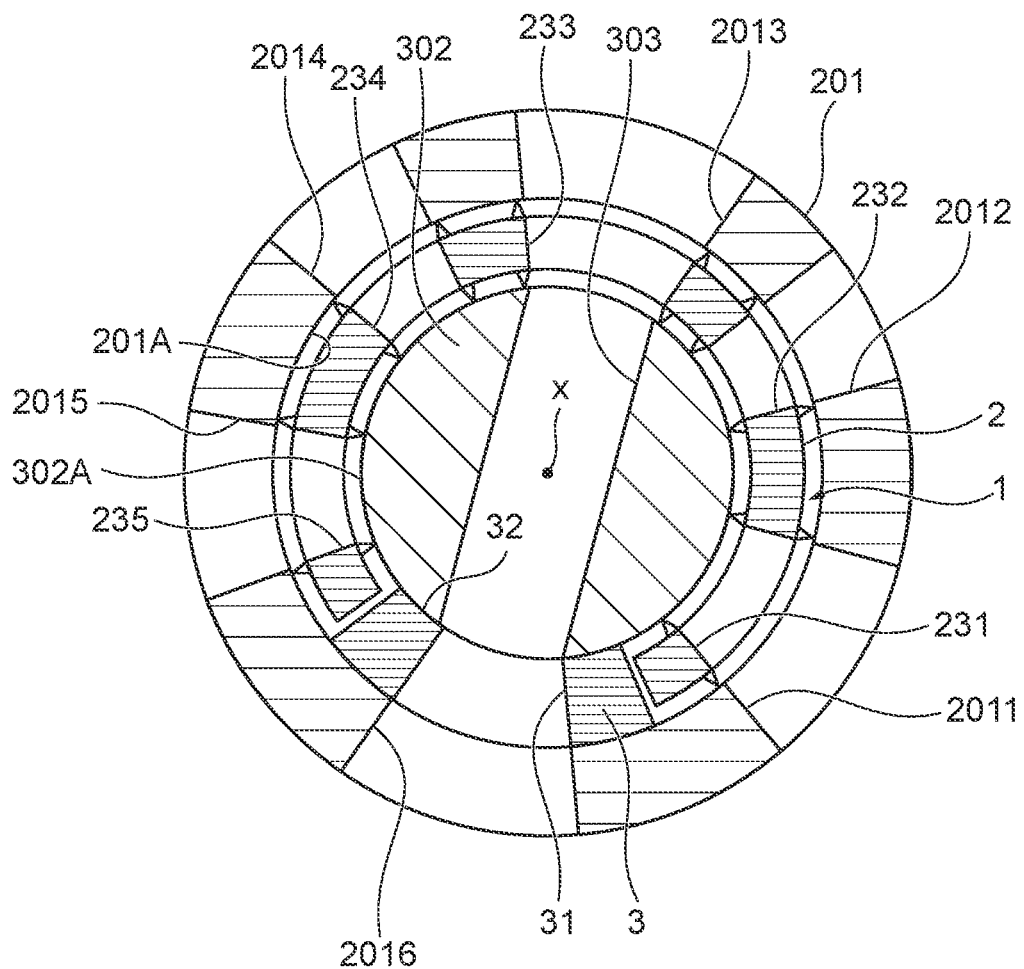
FIG. 2 is a lateral sectional view of the switching device provided with the sealing device according to the embodiment of the present disclosure.
Figure 3:
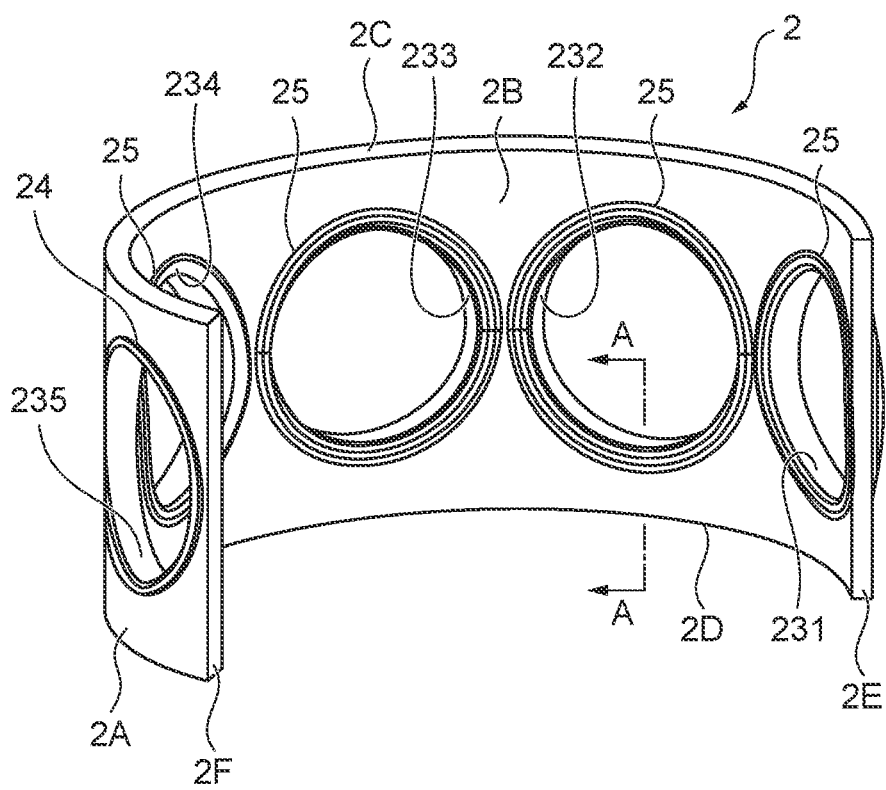
FIG. 3 is a perspective view of a sealing device main body of the sealing device according to the embodiment of the present disclosure.
Figure 4:
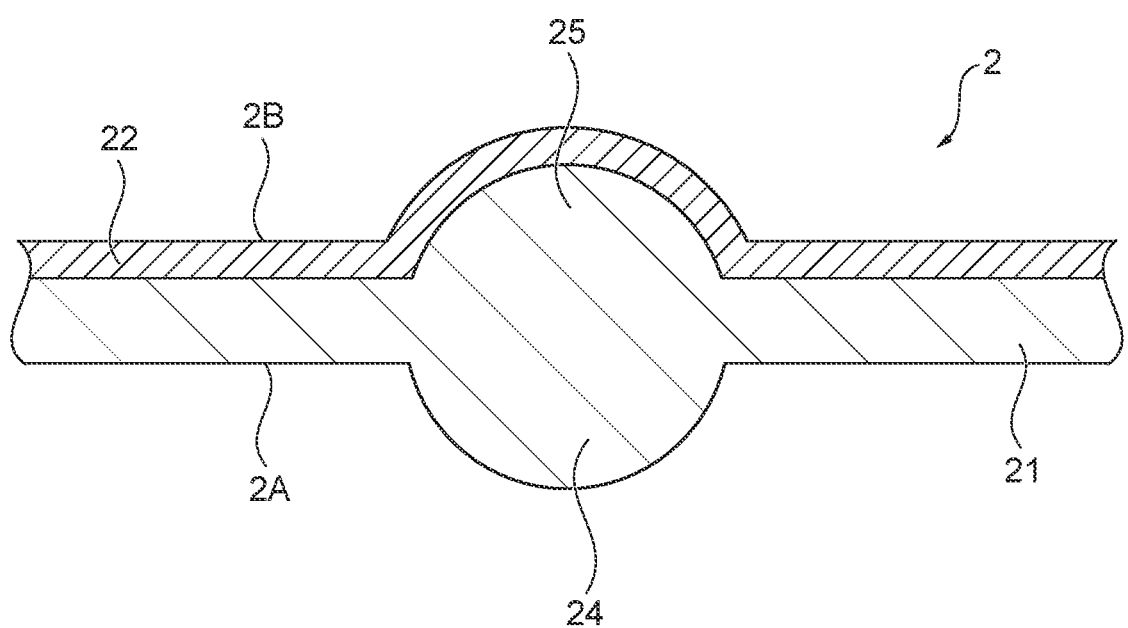
FIG. 4 is a sectional view of the sealing device main body of the sealing device according to the embodiment of the present disclosure.

Hereinafter, an embodiment of the present disclosure will be described with reference to drawings. FIG. 1 is a vertical sectional view of a switching device 100 provided with a sealing device 1 according to an embodiment of the present disclosure, FIG. 2 is a lateral sectional view of the switching device 100, FIG. 3 is a perspective view of a sealing device main body 2 of the sealing device 1, and FIG. 4 is a sectional view of the sealing device main body 2.

As illustrated in FIGS. 1 to 4, the sealing device 1 according to the embodiment of the present disclosure is provided between a housing 200 in which a plurality of opening portions 2011 to 2016 are formed in a tubular inner peripheral surface 201A and a rotor 300 that is disposed inside the housing 200 and switches a flow path by rotating relative to the housing 200. The sealing device 1 includes a sealing device main body 2 that is disposed along the inner peripheral surface 201A and includes a sliding member provided on an inner surface 2B or an outer surface 2A. The sealing device main body 2 has a plurality of through-holes 231 to 235 that communicate with each of the plurality of opening portions 2011 to 2016, and the sealing device main body 2 is a strip plate-shaped member 6 with a flat plate shape that is bent and deformed.

The switching device 100 provided with the sealing device 1 includes the housing 200, the rotor 300 serving as a valve body, a shaft seal 400, a motor 500, and the sealing device 1 and is used as a cooling water multi-way valve that switches a flow path of cooling water or the like in a vehicle, for example.

The housing 200 includes a cylindrical tubular portion 201, a bottom surface portion 202 provided at one end of the tubular portion 201, and an upper surface portion 203 provided at the other end. A plurality of (six in the present embodiment) opening portions 2011 to 2016 are formed in a side surface of the tubular portion 201, and the opening portions 2011 to 2016 are connected to each device mounted in the vehicle via an appropriate fluid path. A through-hole 2031 through which a shaft portion 301 of the rotor 300 passes is formed in the upper surface portion 203.

The rotor 300 has a shaft portion 301 extending in an axis x direction and a rotor main body 302 connected to an end portion of the shaft portion 301. In the rotor main body 302, a communication path 303 is formed that is disposed inside the housing 200 and is opened at two locations of an outer peripheral surface 302A. The shaft seal 400 is disposed between the through-hole 2031 and the shaft portion 301 and seals the housing 200. The motor 500 is connected at an end portion of the shaft portion 301 on the side opposite to the rotor main body 302 and causes the rotor 300 to rotate about the axis x. Note that although the housing 200 and the rotor 300 relatively rotate as the rotor 300 rotates in the present embodiment, a configuration in which the housing rotates may be employed, or a configuration in which both of them rotate may be employed.

The amount of rotation of the motor 500 is controlled by a control device (not illustrated). In this manner, each of both end portions of the communication path 303 communicates with a predetermined opening portion from among the plurality of opening portions 2011 to 2016. In other words, two of the plurality of opening portions 2011 to 2016 communicate via the communication path 303, and the two communicating opening portions are switched by rotation of the motor 500. Therefore, an in-vehicle device as a target to which a fluid is directed or an order in which the fluid flows through a plurality of devices, for example, is switched.

In order to have the plurality of opening portions 2011 to 2016 as described above as independent components (so as not to communicate with each other except through the communication path 303), the sealing device 1 is provided between the inner peripheral surface 201A of the tubular portion 201 and the outer peripheral surface 302A of the rotor main body 302.

Note that although only one communication path 303 is illustrated in FIGS. 1 and 2, a plurality of communication paths may be formed, and the shape of the communication path is not limited to a linear shape. Additionally, the plurality of opening portions may be formed to be aligned in the axis x direction in the housing. The sealing device 1 described below is compatible with the switching device 100 as schematically illustrated in FIG. 1, and the number, the disposition, and the like of components of the sealing device may be appropriately set in accordance with the number, disposition, and the like of the opening portions in the switching device.

The sealing device 1 including the sealing device main body 2 forms a sealing structure along with a bearing member 3. The sealing device main body 2 is disposed along the inner peripheral surface 201A and is formed into a C shape (that is, an opened annular shape) when seen in the axis x direction. Also, the sealing device main body 2 also follows the outer peripheral surface 302A, and following the inner peripheral surface 201A is synonymous with following the outer peripheral surface 302A. As illustrated in FIG. 4, the sealing device main body 2 has a two-layer structure having an elastic layer 21 formed of an elastic member and a sliding layer 22 formed of a sliding member, the outer surface 2A formed by the elastic layer 21 serves as a fixed surface, and the inner surface 2B formed by the sliding layer 22 serves as a sliding surface.

Although the elastic member forming the elastic layer 21 is formed of a rubber material such as natural rubber or synthetic rubber, for example, an elastic resin may be used instead of the rubber material. The sliding member forming the sliding layer 22 is formed of a fluorine resin material such as PTFE, for example.

The sealing device main body 2 has the through-holes 231 to 235, the number of which is smaller than the number of opening portions 2011 to 2016 of the housing 200 by one, and bead portions 24 and 25 that are formed around the through-holes 231 to 235 and project from both surfaces.

Each of the plurality of through-holes 231 to 235 is disposed to overlap the opening portions 2011 to 2015, respectively, and the opening portions 2011 to 2015 are disposed inside the bead portions 24 on the side of the outer surface. The openings of the communication path 303 are disposed inside the bead portions 25 on the side of the inner surface when the communication path 303 communicates with the opening portions 2011 to 2015.

The bead portions 24 and 25 have curved surface shapes, that is, shapes in which distal ends do not have corner parts, as illustrated in FIG. 4 (the sectional view along the line A-A in FIG. 3). In this manner interference between the sealing device main body 2 and the flow path is curbed.

Figure 5:
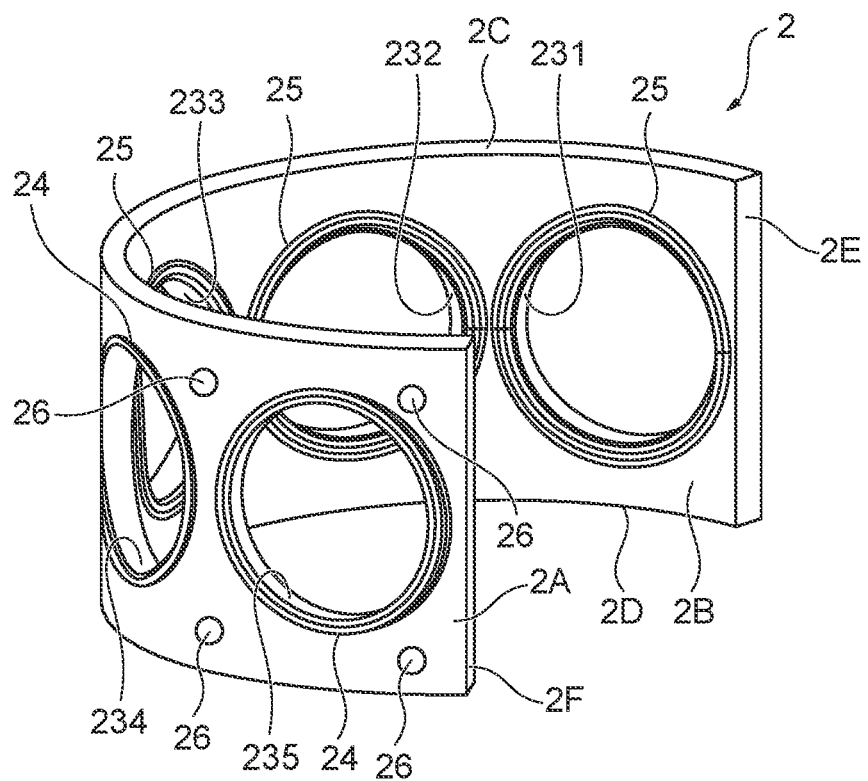
FIG. 5 is a perspective view of the sealing device main body of the sealing device according to the embodiment of the present disclosure.

Gate marks 26 for injecting rubber may be formed in the outer surface 2A of the sealing device main body 2 as illustrated in FIG. 5. By the gate marks 26 being formed on the outer surface 2A that is the fixed surface rather than the sliding surface in this manner, the rotor 300 and protrusions and the like around the gate marks 26 do not cause interference, and it is possible to curb the protrusions and the like around the gate marks 26 affecting (particularly, adversely affecting) rotation, swinging, and the like of the rotor. Although the gate marks 26 are disposed at vertexes of a quadrangular so as to surround the through-holes 231 to 235 in the illustrated example, the disposition of the gate marks may be appropriately set. Also, gate marks may not be formed depending on a molding method.

Figure 6:
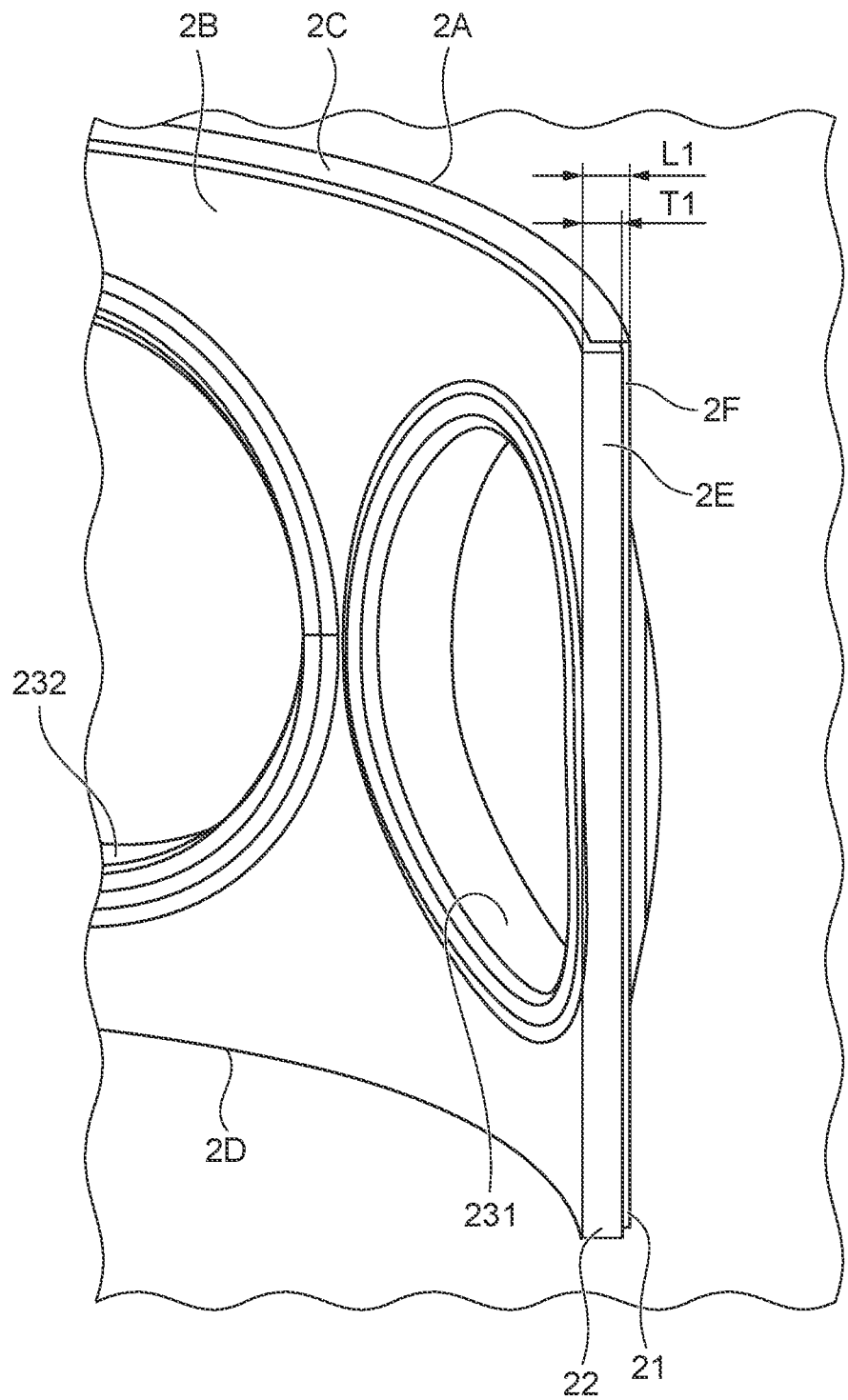
FIG. 6 is an enlarged view of the sealing device main body of the sealing device according to the embodiment of the present disclosure.

The sealing device main body 2 formed into a C shape has a pair of end edge portions 2C and 2D-z extending in a circumferential direction around the axis x and end edge portions (that is, end edge portions facing each other) 2E and 2F extending along the axis x direction. As illustrated in FIG. 6, the sliding layer 22 is folded outward at the end edge portions 2E and 2F, and the elastic layer 21 is covered. In this manner, the sliding member is provided in a region corresponding to half or more from the side of the inner surface 2B at the end edge portions 2E and 2F, and a length L1 of the range where the sliding member is provided at the end edge portions 2E and 2F is half or more a thickness T1 of the end edge portions 2E and 2F. Note that the thickness of the sliding layer 22 is smaller than the thickness of the elastic layer 21 at parts other than the end edge portions 2E and 2F and is preferably 30% or less of the thickness T1. This facilitates formation of the bead portions 24 and 25 by molds 601 and 602 as will be described later.

The bearing member 3 has a through-hole 31 that is formed into an arc shape when seen in the axis x direction, has an outer peripheral surface fixed to the housing 200, and communicates with the opening portion 2016 and a sliding surface 32 that faces the inside of the housing 200. The bearing member 3 is formed of a harder member than the sealing device main body 2, and the sealing device main body 2 is more easily deformed than the bearing member 3. Note that the bearing member 3 may be formed integrally with the housing 200.

The C-shaped sealing device main body 2 and the arc-shaped bearing member 3 form the sealing device 1 having an annular shape as a whole. At this time, rotation of the sealing device main body 2 is restricted by the sealing device main body 2 abutting the bearing member 3 fixed to the housing 200 from the circumferential direction. The sealing device main body 2 (particularly, the bead portions 24 and 25) are mainly compressed and deformed when the annular sealing device 1 is disposed between the inner peripheral surface 201A of the tubular portion 201 and the outer peripheral surface 302A of the rotor main body 302. Also, the dimension of the sealing device main body 2 in the circumferential direction with respect to the dimension of the entire sealing device 1 in the circumferential direction is 75% or more, for example, in the present embodiment.

Figure 7:
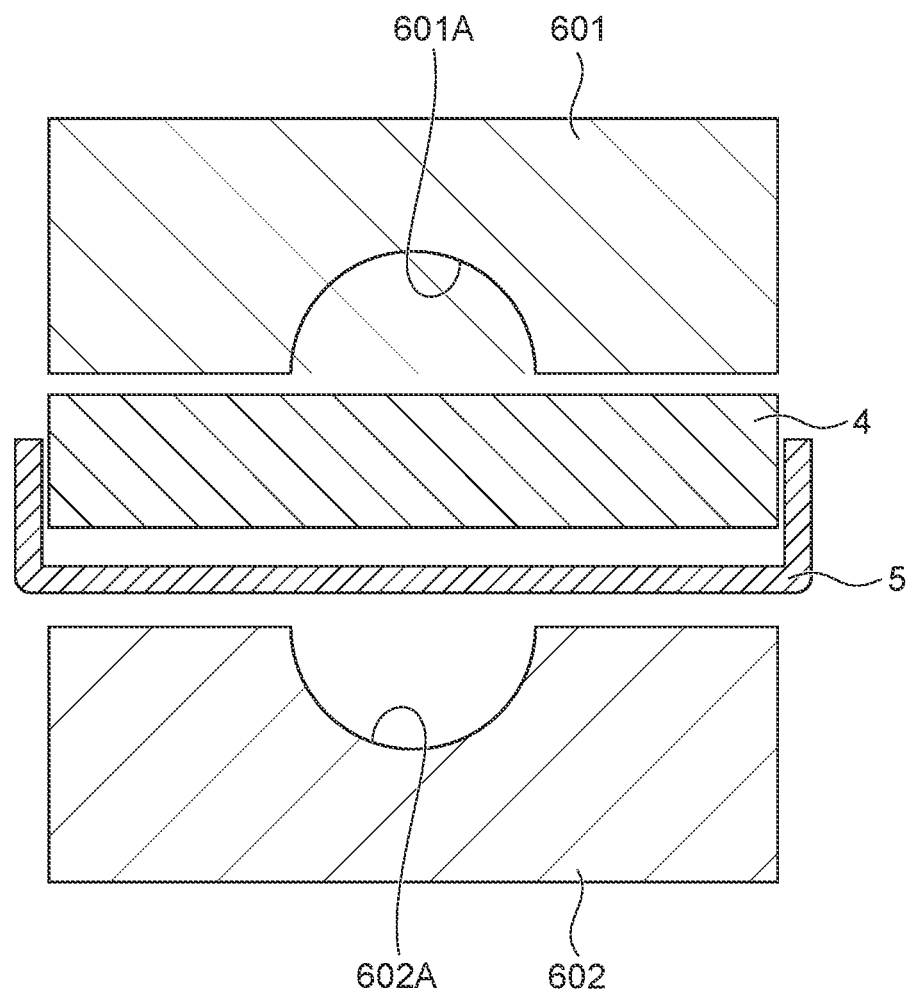
FIG. 7 is a sectional view illustrating a manufacturing process of the sealing device main body of the sealing device according to the embodiment of the present disclosure.

Here, a method for manufacturing the sealing device main body 2 will be described. As illustrated in FIG. 7, molding is achieved by stacking a rubber material 4 and a sheet 5 made of a fluorine resin, pinching them with a pair of molds 601 and 602, and applying pressure to them. Recessed parts 601A and 602A are formed in the molds 601 and 602, such that the bead portions 24 and 25 are formed by the recessed parts 601A and 602A. Also, an end portion of the sheet 5 is folded back about 90° such that the sliding layer 22 can cover the elastic layer 21 as described above.

Although FIG. 7 schematically illustrates a state where the rubber material 4 is disposed between the molds 601 and 602 with the molds 601 and 602 kept in an open state, the rubber material may be injected in a mold clamping state, and in this case, paths for injecting rubber (gate holes) are formed in the recessed parts 601A and 602A, and the gate marks 26 as described above are formed in the rubber after the molding. Note that pressurizing and heating timings and a rubber injection timing may be appropriately set. It is possible to mold the rubber in a state where the sheet 5 made of a fluorine resin is fixed by injecting the rubber material in the rubber clamping state, and disposition of the sheet 5 at an appropriate position with respect to the sealing device main body 2 is facilitated.

Figure 8:
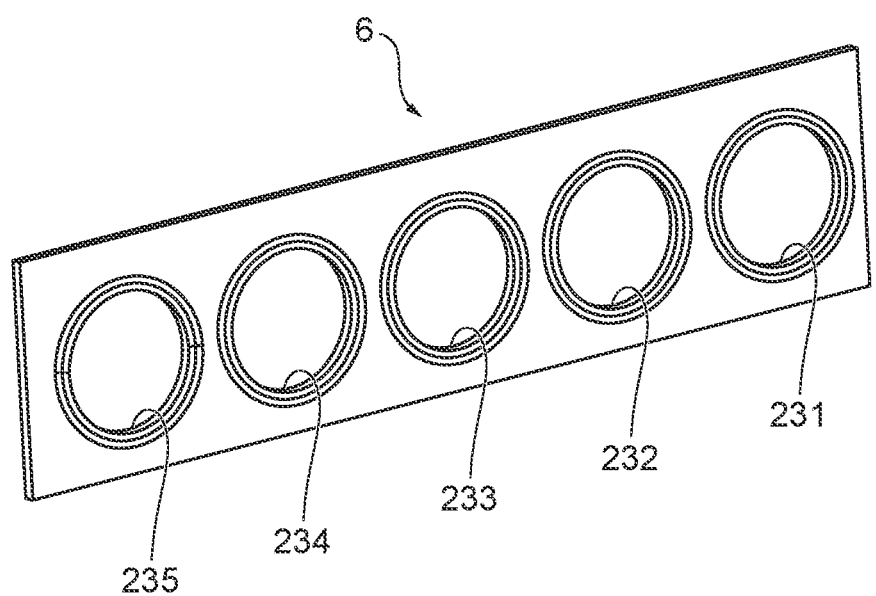
FIG. 8 is a perspective view of a strip plate-shaped member of the sealing device according to the embodiment of the present disclosure.

A strip-shaped member in which the fluorine resin material and the rubber material are chemically attached and stacked is formed through molding using the molds 601 and 602 as described above. The strip plate-shaped member 6 as illustrated in FIG. 8 is formed by performing punching on such a strip-shaped member as needed. The strip plate-shaped member 6 has a plurality of through-holes 231 to 235. At this time, the strip plate-shaped member 6 may not be a completely flat plate and may have slight warpage.

Thereafter, the C-shaped sealing device main body 2 is formed by bending and deforming the strip plate-shaped member 6 to follow the circumference. At this time, the strip plate-shaped member 6 may be wound around the outer peripheral surface 302A of the rotor main body 302 and may then be inserted into the housing 200, or the strip plate-shaped member 6 may be bent and deformed to follow the inner peripheral surface 201A of the tubular portion 201, and the rotor main body 302 may then be inserted, or a jig may be used to bend and deform the strip plate-shaped member 6.

If the strip plate-shaped member 6 with a flat plate shape is bent and deformed as described above, a difference in the peripheral length occurs between the inner peripheral surface and the outer peripheral surface in accordance with the thickness of the strip plate-shaped member 6. At this time, since the rubber material 4 is more likely to respond to expansion and contraction than the sheet 5 made of a fluorine resin, the longitudinal dimension of the entire strip plate-shaped member 6 before the bending and deformation is set to be equal to the peripheral length of the inner surface 2B after the bending and deformation (substantially equal to the peripheral length of the outer peripheral surface 302A of the rotor 300). Not that in a case where the outer surface of the sealing device main body serves as a sliding surface as will be described later, the longitudinal dimension of the entire strip plate-shaped member before the bending and deformation may be set to be equal to the peripheral length of the outer surface after the bending and deformation.

Although once the sealing device main body 2 formed as described above is taken out of the housing 200, the sealing device main body 2 tends to be restored to become closer to the flat plate shape which is the original shape, the sealing device main body 2 may be difficult to be restored in a case where it has been bent and deformed for a long period of time. In such a case as well, if the extracted sealing device main body 2 is heated to such an extent that the fluorine resin is not melted, the fluorine resin member tends to be restored to the original state. In this manner, the sealing device main body 2 is deformed to become closer to the flat plate shape. At this time, it is not necessary for the sealing device main body 2 to be restored completely to the flat plate shape, and it is only necessary to become closer to the flat plate shape than the state at the time of the extraction.

According to the sealing device 1 of the embodiment of the present disclosure, the sealing device main body 2 is the strip plate-shaped member 6 that is bent and deformed, and it is thus possible to form the sealing device main body 2 through bending and deforming after the through-holes 231 to 235 are formed in the strip plate-shaped member 6 with a flat plate shape or a significantly large curvature radius. In this manner, it is possible to easily form the through-holes 231 to 235 while providing the sliding member, to easily manufacture the sealing device 1, and to achieve a reduction in friction.

Also, the sealing device main body 2 has the bead portions 24 and 25 projecting from both surfaces, and it is thus possible to improve a contact pressure with respect to the housing and the rotor 300 and to easily secure sealability. It is possible to reduce the number of manufacturing processes as compared with a method in which the pressurization molding and the molding of the bead portions are performed in separate processes, by forming such bead portions 24 and 25 when pressure is applied to the rubber material and the fluorine resin sheet.

Also, the sliding member is provided in a region corresponding to half or more from the side of the inner surface 2B on which the sliding member is provided at the end edge portions 2E and 2F, and it is thus possible to achieve a reduction in friction even in a case where the end edge portions 2E and 2F and the rotor 300 cause interference.

Figure 9:
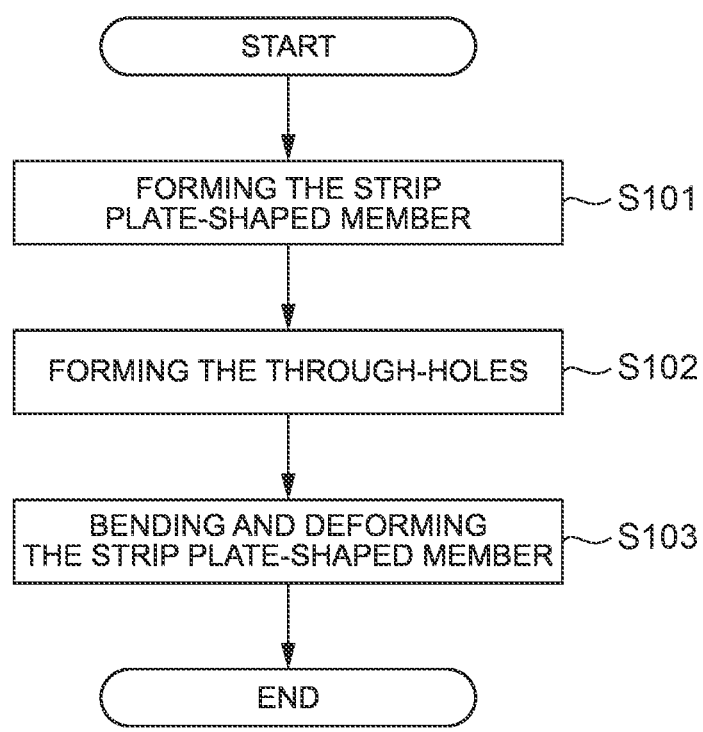
FIG. 9 is a flowchart for explaining a method for manufacturing the sealing device main body according to the present embodiment.

FIG. 9 is a flowchart for explaining a method for manufacturing the sealing device main body 2 according to the present embodiment. As illustrated in FIG. 9, the strip plate-shaped member 6 with a plate shape including the sliding layer 22 provided on one surface side is formed by stacking the rubber material 4 and the sheet 5 made of a fluorine resin, pinching them with the pair of molds 601 and 602, and applying pressure (see FIG. 7) (Step S101).

The through-holes 231 to 235 are formed in the strip plate-shaped member 6 after the strip plate-shaped member 6 is formed (Step S102). Note that Step S102 may be performed when the strip plate-shaped member 6 is formed.

The strip plate-shaped member 6 is bent and deformed, and the C-shaped sealing device main body 2 is thereby formed (Step S103).

Figure 10:
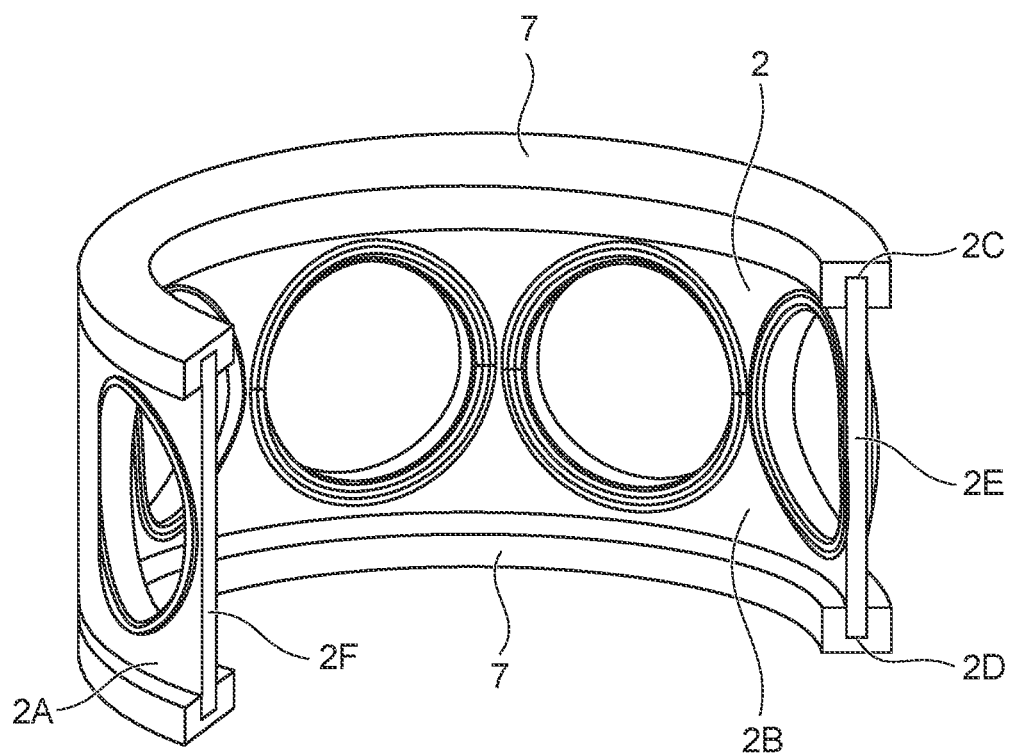
FIG. 10 is a perspective view of a sealing device main body of a sealing device according to a modification example of the present disclosure.

Note that the present disclosure is not limited to the above embodiment, includes other configurations and the like with which the object of the present disclosure can be achieved, and also includes modifications and the like described below. For example, although the sealing device main body 2 is formed by bending and deforming the strip plate-shaped member 6 in the above embodiment, a holding member 7 to maintain the bent and deformed state may be provided as illustrated in FIG. 10. The holding member 7 is formed into a C shape and holds end edge portions 2C and 2D of the sealing device main body 2. The holding member 7 may be accommodated in the housing 200 along with the sealing device main body 2, or may be detached when the sealing device main body 2 is accommodated in the housing 200 and may be used as a jig. Also, the sealing device main body 2 may be accommodated in the housing 200, and only the holding member 7 on the side of the upper surface portion 203 out of the pair of holding member 7 may be detached.

Also, although the sealing device main body 2 is restored into the flat plate shape when it is taken out of the housing 200 and is then heated in the above embodiment, a sliding member that is unlikely to be deformed by heating, for example, may be used.

Although the bead portions 24 and 25 are formed on the outer surface 2A and the inner surface 2B of the sealing device main body 2 in the above embodiment, the bead portions may be provided only on one surface, and no bead portions may be provided on either surface in a case where it is easy to curb leakage of a fluid with a material, a contact pressure, or the like of the sealing device main body.

Furthermore, although the sliding layer 22 is folded back outward at the end edge portions 2E and 2F in the above embodiment, the sliding layer 22 may not be folded back in a configuration in which, for example, the sliding layer 22 is formed to be thick such that only the sliding member contacts when the corner portion of the end edge portion 2E on the side of the inner surface 2B interferes with the rotor 300. In such a case, the region where the sliding member is provided at the end edge portions 2E and 2F may be less than half the thickness T1.

Moreover, although the bead portions 24 and 25 are formed when pressure is applied to the rubber material and the fluorine resin sheet in the above embodiment, the bead portions may be formed after a plate-shaped member is molded by applying pressure. With such a configuration, it is possible to freely set the shape of the bead portions.

Also, the timing at which the bead portions are formed and the timing at which the through-holes are formed may be appropriately set, and in a case where the bead portions are molded by using the molds as in the above embodiment, for example, sites for forming the through-holes may be provided in the molds, and the bead portions and the through-holes may be formed at the same time.

Also, although the strip plate-shaped member 6 is formed by stacking the rubber material and the fluorine resin sheet and applying pressure by the molds 601 and 602 in the above embodiment, the method for manufacturing the strip plate-shaped member is not limited thereto, and an appropriate method may be employed in accordance with a material and the like of the elastic member that serves as a base material. For example, the strip plate-shaped member may be molded by attaching a sheet-shaped sliding member to a rubber plate or an elastic resin plate and performing working such as cutting or punching. At this time, the attachment between the elastic layer and the sliding layer is not limited to chemical attachment by a surface treatment or an adhesive, and physical adhesion and the like by surface working or an adhesion is appropriately selected.

Although the sealing device 1 includes the sealing device main body 2 and the bearing member 3 in the above embodiment, the sealing device may not include the bearing member. If the number of through-holes in the sealing device main body is equal to the number of opening portions formed in the housing, the bearing member is not needed. Also, in a case where the number of through-holes in the sealing device main body is smaller than the number of opening portions formed in the housing by one, one of the opening portions in the housing does not overlap any through-holes in the sealing device main body, and the opening portion is sectioned from the other opening portions by the sealing device main body such that communication is not established. Therefore, the bearing member may not be provided.

Also, in a case where the number of through-holes in the sealing main body is smaller than the number of opening portions formed in the housing by two or more, it is necessary to provide a bearing member having one or more through-holes. Since the bearing member is less likely to be deformed than the sealing device main body, the bearing member is unlikely to become a resistance when the rotor rotates. Therefore, although it is possible to further reduce a torque as the dimension of the sealing device main body in the circumferential direction is shorter with respect to the peripheral length of the inner peripheral surface of the housing, the dimension of the sealing device main body in the circumferential direction is preferably 50% or more of the peripheral length of the inner peripheral surface of the housing and is more preferably 75% or more as in the above embodiment. Note that in a case where it is easy to assemble the rotor, or in a case where it is possible to secure stability of rotation, for example, the dimension of the sealing device main body in the circumferential direction may be less than 50% of the peripheral length of the inner peripheral surface of the housing.

Although the inner peripheral surface 201A of the housing 200 has a cylindrical shape in the above embodiment, it is only necessary for the inner peripheral surface of the housing to have a tubular shape. In other words, the inner peripheral surface of the housing may be inclined with respect to the axial line (that is, it may have a truncated cone shape), or may have an arc shape in a section including the axial line (that is, it may have a shape corresponding to a ball valve). At this time, it is only necessary for the strip plate-shaped member to have the shape before the bending and deformation such that the strip plate-shaped member follows the inner peripheral surface of the housing by being bent and deformed.

Although the inner surface 2B of the sealing device main body 2 serves as the sliding surface and the outer surface 2A serves as the fixed surface in the above embodiment, the inner surface may be caused to serve as a fixed surface and the outer surface may be caused to serve as a sliding surface by providing the sliding member only on the outer surface. In other words, a configuration in which the sealing device main body follows the rotor (valve body) may be employed.

Although the embodiment of the present disclosure has been described above, the present disclosure is not limited to the sealing device according to the embodiment of the present disclosure and includes all aspects included in the concept and the scope of the claims of the present disclosure. Also, each configuration may be appropriately and selectively combined to achieve at least a part of the aforementioned object and effects. For example, the shape, the material, the disposition, the size, and the like of each component in the above embodiment may be appropriately changed in accordance with a specific utilization aspect of the present disclosure.

What is claimed is:

1. A method for manufacturing a sealing device that is provided between a housing in which a plurality of opening portions are formed in a tubular inner peripheral surface and a rotor that is disposed inside the housing and rotates relative to the housing, the method comprising:
    forming a strip plate-shaped member with a central axis and the plate shape that includes a sliding member provided on a side of one surface, wherein the strip plate-shaped member is molded by stacking a rubber material and a fluorine resin sheet and applying pressure in a stacking direction;
    forming through-holes in the strip plate-shaped member during formation or after formation of the strip plate-shaped member; and
    bending and deforming the strip plate-shaped member along an inner peripheral surface thereof to form a main body of the sealing device having a C-shape defined by opposing end edges extending in a circumferential direction around the central axis and opposing side ends extending in a direction of the central axis such that a gap is formed continuously between the opposing side ends.

2. The method for manufacturing a sealing device according to claim 1, wherein in a state that the pressure is applied to the rubber material and the fluorine resin sheet, bead portions projecting from both surfaces are formed around the through-holes in the strip plate-shaped member or around positions where the through-holes are to be formed.

3. The method for manufacturing a sealing device according to claim 1, wherein pressure is applied to the rubber material and the fluorine resin sheet by using a mold having a rubber injection portion.

* * * * *